Patented Oct. 21, 1952

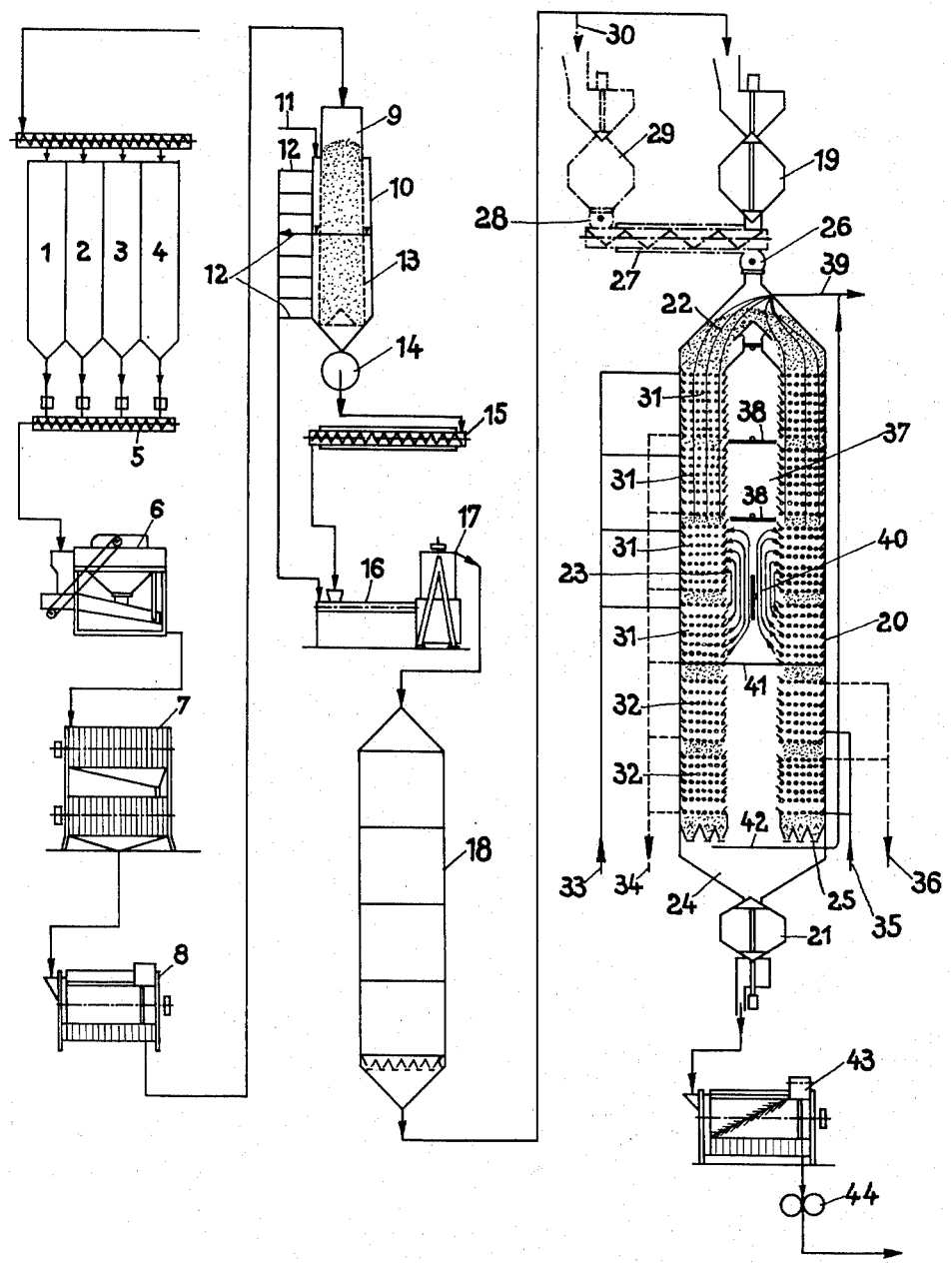

2,614,935

UNITED STATES PATENT OFFICE 2,614,935

METHOD OF TREATING GRAIN FRUIT, ESPECIALLY BREAD GRAIN

Karl Dienst and Waldemar Dienst,
Hildesheim, Germany

Application December 6, 1950, Serial No. 199,420
In Switzerland October 19, 1950

6 Claims. (Cl. 99—80)

This invention relates to a method of treating grain fruit, especially bread grain, and it is one of the objects of the invention to devise a method which can be varied so as to make it applicable for grain fruits of different kinds and for a variety of individual treatments which the grain must undergo to obtain the various products adapted to be made from the grain.

The method in being carried out makes use of a number of known, but partly improved devices and more particularly of an improved vacuum apparatus that may be regarded as a vacuum trickling drier, which devices are combined in one common plant. This plant is so constructed that certain of its parts can be bridged for allowing the various materials to be treated in a continuous operation in the most advantageous way.

The most important requirement of the treatment of grain fruit is a substantially perfect equalization of the moisture content of the individual grains, for example, of a grain mixture, which are more or less moist in accordance with the different harvest conditions.

Hitherto, for attaining the desired moisture equalization the grain mixtures were stored for days in silos in which they were repeatedly moved from one compartment to another and the while subjected or not subjected to wetting operations. The results of this known method are impaired by the fact that the grain mixtures, which are, for instance, designed to be treated in a mill, constantly change both as regards their character and the percentage of their constituents. In addition, the climatic conditions, the temperature of the air and the relative humidity of the air continuously change too. It is well-known that heat, moisture and time are the most important factors in the equalization of the moisture, and it is a known fact that in the cold of the winter an equalization of the moisture cannot be attained at all and the mills are then run at a loss. Moisture equalization is, however, attained in an almost perfect degree, if the vacuum trickling drier is used for equalizing the differences of moisture of the individual grains, provided its use takes place in the last stage of the series of operations.

With the wetting method employed hitherto the water was added to the material stepwise in small amounts to gradually increase the moisture content to the desired final degree. With this method some grains absorb more and the others less water so that in the end the equalization of the moisture percentage of the grains is only imperfect. According to the method devised by the invention the material is laden with the desired quantity of water much quicker, and this may, for instance, be done by strongly wetting the material but once, or by a continuous softening operation consisting, for instance, in continuously conveying a column of material through a container holding a water bath of regulable height. The vacuum apparatus removes the excess water and thereby establishes at the same time the desired equalization of the water content of the grains.

The known method of repeatedly wetting the material in small amounts implies the use of a number of wetting devices, conveying means and containers, which require control for the number of days which the treatment takes, while when strongly wetting the material only once, which can be done on a rough scale without accurately determining the amount of water applied, or when softening the material as indicated, the numerous wetting and quieting containers can be dispensed with and it is sufficient to use instead one simple container which can be continuously controlled in short intervals. The softening method, moreover, yields the additional advantage that every single grain will be completely surrounded with water, which is not possible by an intermittent wetting of the material with small amounts of water, and that 2 to 5% and for particular purposes up to 15% and more water can without any disadvantages be incorporated in the material in one single operation within a very short time, for example, in one hour.

The rapid incorporation of the water can be accelerated by regulating the temperature of the water in the softening container. The operation also allows the moisture to readily penetrate into the core of each grain. For the grinding of bread-grain of the various kinds it is of the greatest importance that the structure of the individual grains has been loosened, i. e. that the grains possess a certain degree of "mellowness" or friability, in which state they are easily ground. This mellowness ought to be substantially equal for all grains of a grain mixture. According to the amount of added and incorporated water there can be attained a corresponding increase of volume, if the grain is left to itself in a quieting container for a certain time until swelling takes place. This swelling operation can be performed in a transit cell without the application of heat in about 8 to 16 hours, which depends on the kind and hardness of the grain, or with the application of heat in 1 to 2 hours by providing the quieting container with radiators, which may be heated with the condensation product of the vacuum drier.

In treating, for example, hard well-adhesive wheat the heating must be regulated in such a manner that the temperatures in the grain do not rise so high as to deleteriously affect the gluten. The temperatures in the grains should as a rule not exceed about 35° C. to 40° C. The loosening of the structure, i. e. the mellowing of the grains, is brought about by the vacuum apparatus, which is constructed as a trickling drier.

In treating soft little-adhesive wheat, the gluten of which can be hardened, that is ameliorated by temperatures between 50° C. and 60° C., the treatment by heated radiators offers the possibility of not only swelling the grains but also improving their baking properties. The loosening of the structure of the grains, also in this case, is brought about by the vacuum apparatus as stated before.

Rye is preferably heated in the swelling operation at temperatures between 40° C. and 50° C. and afterwards likewise subjected to a finishing treatment in the vacuum trickling drier.

Barley, if designed to be used for the production of flour, is preferably caused to swell at temperatures of 40° C. and then heated in the same course of operation to 60° C. and more, whereby a partial agglutination of the starch is produced, yielding a broken-up flour which, for instance, may serve as a nutrient for children.

In swelling corn the temperatures to be applied depend on the purpose for which the product is to be used. First, the corn grains must be treated so as to allow the germ to be easily extracted. This requires a thorough loosening and mellowing of the endosperm, which can be attained the better the more water is caused to permeate the grains to the core. To this end, the corn is wetted up to 24 per cent of water. If the corn is designed to be used for the production of alcohol or of broken-up nutrients, the heating of the corn grains is at first carried on until swelling occurs, which is at about 40° C., and then continued in the same course of operation up to a temperature of 80 to 90° C. If, however, raw non-agglutinated starch is to be produced from the endosperm, the heating should not be carried beyond some 40° C. After the heat treatment redrying is effected in the vacuum apparatus in the moisture content most favorable for grinding, which is at about 17 per cent. The capability of the vacuum apparatus of extracting from the material large quantities of moisture at lowest temperatures in a most economic way, makes the outlined dry method of treating the corn considerably superior to the wet method hitherto applied to the treatment of corn.

In the production of broken-up rice products the raw rice is subjected to the swelling method with a heat treatment at temperatures from 80 to 90° C. followed by a treatment in the vacuum apparatus. The heat treatment and succeeding treatment in the vacuum apparatus of wet gathered rice yields particularly favorable results in respect of the pealing of the rice. The rice peel detaches more easily and tensions in the rice grain, which are often set up by a one-sided surface drying in the field by the sun, are balanced so that less breakage occurs in the drying.

Legumes designed to be worked into nutrients are sufficiently wetted and then likewise broken up by treating them in the swelling operation at about 40° C., then at about 80 to 90° C. and at last in the vacuum apparatus yielding the final products.

The treatment of oats for the production of nutrients is carried out in substantially the same way, the oats being sufficiently wetted, submitted to the swelling operation at about 40° C., then heated to temperatures of 80 to 90° C., and thereafter dried in the vacuum apparatus.

If it is desired to render inactive the enzymes present in the epidermis and germ of the grain, this can be attained by a short-time heat treatment after the wetting or softening, care having to be taken in this treatment that the inner core of the grain is not deleteriously affected by the action of the heat. This operation makes it necessary that the epidermis is amply permeated with water during the heat treatment and that a sudden cooling can take place after the heat treatment. The operation can most simply be carried out by interposing between the softening device and the washing device heating means in the form of a heated worm conveyor. In such operation the absorption of water by the individual grains is considerable and different, but this difference is compensated and regulated by passing the material in the final stage of the process through the vacuum apparatus.

If, for certain kinds of material and for the products to be obtained therefrom, it is desired to get in the grinding hard, granular and pure grits and granular flours with good baking properties, there is preferably mounted in the sluice chamber, which serves to introduce the material into the vacuum apparatus, a heated worm in such a manner that it is both cut from the atmosphere and from the vacuum of the vacuum drier. This can, for instance, be attained by two suitable rotary valves. The material is evacuated before it passes into the worm. In moving continuously through the worm, the material is for a predetermined length of time brought to the desired temperature by heating the worm shell and introducing a predetermined regulable quantity of live steam at negative pressure. For preventing the temperature in the core of the grains from exceeding the critical limit the material is then introduced into the drying compartment of the vacuum drier where it is exposed to a high vacuum and suddenly cooled accordingly. In this way there is also obtained a treatment of the epidermis of the material, because any further deleterious heat influence on the inner core of the grains can be prevented in the vacuum apparatus.

The material, such as bread-grain, introduced into the sluice compartment may also be put under pressure by admitting live steam of higher pressure for a relatively short period of time, within which the baking properties of the grain are not affected. When the material is thereupon passed into the vacuum compartment it is suddenly relieved of the pressure by the vacuum prevailing therein. This sudden expansion produces a loosening of the structure by which the grinding properties are improved.

The treatment of the material with steam in the sluice compartment of the vacuum apparatus also allows of disembittering certain legumes, such as soya beans, lupines or chestnuts, or obtaining the enzymatic neutralization of lipases, peroxydases etc. in legumes, as well as the deodorization of musty corn, oats, soya beans, etc., if in succession to the said treatment the water, the split bitter principles and other noxious components are removed in the vacuum apparatus by a kind of vacuum water-steam distillation.

The vacuum apparatus preferably has several heating elements or heating sections arranged below one another and adapted to be heated by steam of different temperatures.

In solving the problem of moisture equalization the heating elements must be heated in such a way that the evaporation, i. e. the extraction of the quantities of moisture in surplus of the desired final moisture percentage, takes place in the lower heating sections, the vapor produced being preferably conducted upwardly as a counter-flow through the grain slowly trickling in downward direction. The vapor condenses on the grain in the higher layers where it is still cold and thus aids in warming the grains and, more particularly, softening the epidermis of the grains so as to make it readily permeable for the moisture when the grains reach the evaporation zone. The condensed vapor must be evaporated again and again so that a circulation of vapor is maintained in a certain section of the vacuum drier, in which the calories of the circulating vapor are preserved and favorably utilized.

In drying the grain in vacua the vaporizing process is physically based on the difference of the steam pressures in the unequally moist grains so that, as well-known, the moist grains yield their moisture first, whereby these grains are gradually brought to a moisture percentage corresponding to that of the driest grains. In order to utilize the circulating vapor as much as possible, the discharge of the vapor rest to be passed to the condenser is effected at the top section of the vacuum drier. The amount of vapor discharged corresponds to the amount of water extracted from the grain under treatment which was contained in the grain in excess of the desired moisture percentage.

The moisture equalization by way of a stepwise evaporation of water from the grains containing most moisture and the utilization of the circulating vapor moving in a prescribed path are only rendered possible by using the vacuum apparatus as a trickling drier, since it is only in such a drier that water can be evaporated at low temperatures which do not impair the grain.

With the drying in vacua the grains do not shrink or agglomerate, such as is the case in air drying. On the contrary, they retain the greater volume produced by the vacuum with an inherent loosening of the grain structure. Grinding is considerably facilitated by the mellowness attained through the drying in vacua.

As any desired quantity of water can be extracted in the vacuum drier in a single operation, it is possible to incorporate in the grains any amount of water in excess of the usual moisture percentage which is held the most favorable for the treatment. This moisture excess is, for example, 3 to 5 per cent for the normal conditions of treatment in the mill and may be 5 to 15 per cent for special grinding purposes, such as for the centrifugal or impact grinding method, while it is secured by the vacuum drier that the moisture extraction takes place at low temperatures at which the baking properties are not impaired.

The cooling of the dried grain can be performed in the lower sluice compartment which is provided for delivering the dried grain from the drier. The cooling is obtained by producing in the said compartment a vacuum higher than in the drier, the grain being exposed between the inlet and the outlet of the compartment to the action of this high vacuum for some minutes, for example, 5 to 10 minutes.

Cooling may also be effected in the vacuum drier itself by passing through its lower elements or sections a cooling medium, which is so regulated as to prevent the deposition of condensed fluid on these elements, and by so directing part of the vapor developed in the drier that it is sucked off through the grain to be cooled below the cooling elements. The vapor so directed serves as an agent mediating the cooling, since by contact-cooling alone the desired effect cannot be attained, unless there are provided very large cooling surfaces which, however, is uneconomic.

The lower sluice compartment can also be used for imparting to the epidermis of the grains a certain degree of toughness favorable to the grinding by allowing the ingress of moist air before discharging the contents of the compartment. There may also be introduced into the evacuated filled sluice chamber chemicals in the form of gas or dust which have a sterilizing effect or are adapted to improve the baking properties, such as sulphurous acid, methyl formate, ethylene oxide, pyrenone, nitric oxide, chlorine, chlorine dioxide etc.

The accompanying drawing illustrates, by way of example, a diagrammatic illustration of a plant for carrying out the method according to the invention.

The numerals 1, 2, 3, 4, designate four silos which are filled with the material to be treated and from which the material, in predetermined mixtures if desired, is withdrawn by means of a worm conveyor 5. The material is successively passed through a cleaning machine 6, a system of separators 7 and a peeling machine 8. In these devices the grain is freed from admixtures, weed grains and the peel. Arranged in succession to the peeling machine is a softening device, in which the material can be strongly wetted or softened. The softening device consists of a container 10 which is provided with a water supply 11 and a number of drain pipes 12 at different heights. These drain pipes allow of establishing any desired water level in the softening device. The container 10 encloses a perforated container 13 which serves to guide the grain to be wetted or softened through the device. The material continuously supplied at the top of the container 13 forms a column of material which gradually moves through the water of the container 10, whereby it is softened for a more or less long time. Due to the fact that the water in the container 10 can be held at any desired level, it is possible to regulate within wide limits the water contents of the material leaving the softening device through a rotary valve or gate 14 of known construction. The carrying along of water through the gate is not objectionable, because this water can be utilized in the washing process. The material passes from the gate 14 to a heated worm conveyor 15, in which the epidermis of the grains is quickly heated for a short time. This heat treatment is advantageous for the treatment to follow since it makes the epidermis more easily detachable from the core. Upon leaving the worm 15 the material passes through a stone-removivng machine 16 and a washing machine 17 to a quieting tank 18. In this tank the material is allowed to swell while it travels continuously through it for 8 to 16 hours. Heaters mounted in the tank may be used to accelerate the swelling process so that the time of travel of the material through the tank can be reduced to one to two hours. The discharge pipe of the quieting tank 18 opens into a vacuum apparatus which consists of an inlet sluice 19, a vacuum container 20 and an outlet sluice 21. The vacuum container of this apparatus comprises three sections: an upper section 22 for material to be treated, an intermediate section 23 for material to be treated and a lower section 24 for material already treated. Interposed between the sections 23 and 24 is a discharge device 25 by which the trickling movement of the material through the vacuum apparatus can be regulated. Arranged between the inlet sluice 19 and the vacuum container 20 is a subsidiary sluice 26, into which opens a worm conveyor 27 with a heated shell. The other end of the shell-heated worm 27 is provided with another subsidiary sluice 28 to which is connected a sluice 29 corresponding to the inlet sluice 19. A branch 30 of the feed conduit coming from quieting tank 18 opens into the sluice 29. Owing to this arrangement, the material from the tank 18 may be passed either through the inlet sluice 19 into the vacuum apparatus 19, 20, 21 or by the branch conduit 30 and the second inlet sluice 29 through the subsidiary sluice 28, the shell-heated worm 27 and the subsidiary sluice 26 into the vacuum container 23 of the vacuum apparatus 19, 20, 21. The second inlet sluice 29, which is provided for special purposes, more particularly serves for the treatment of the epidermis of the material in vacua as well as for the disembittering of legumes or the like. The upper part of the vacuum container 20 comprises a number of heating sections 31 and the lower part a number of cooling sections 32. The heating medium for the heating sections is supplied by the piping 33 and led off by the piping 34, while pipings 35 and 36 serve to pass the cooling medium to and from the cooling sections. Arranged in the vacuum container 23 for guiding the vapor is a shaft 37 which is provided with throttle valves 38 which can be adjusted so that the vapor is either forced to pass in counter-flow through the down-trickling material or is drawn from the shaft 37 through a suction pipe 39 to a condenser. When the vapor is guided through the material in counter-flow, a circulation 40 is produced at the heating elements 31 in the evaporation zone. If the vapor shaft 37 is tightly closed by flaps 41 and the vapor is drawn off at 42 below the cooling elements 32, the vapor serves as a mediator in the cooling of the material at the cooling elements 32. The suction pipes 39 and 42 may be separately connected to a condenser. Material re-cooled in the outlet sluice 21 and before being discharged therefrom may be treated with moist air and/or chemicals in the form of gas or dust, whereupon the material may be passed for further treatment through a re-cleaning device 43 to a grinding machine 44.

The assembly of successive individual apparatus as illustrated in the drawing can be provided with by-pass feeding conduits for the material to account for special cases where one or the other apparatus should not be used.

In practicing the method according to the invention the vacuum steam or warm water yielded in the vacuum drying operation can be largely utilized for heating the radiators in the swelling operation as well as in the softening and washing operations.

Having thus described our invention, what we claim and desire to secure by Letters Patent, is:

1. A method for continuously conditioning a moving current of grain comprising the steps of passing the current through water, heating the grain for a time and at a temperature sufficient only to soften the epidermis of the kernels, then cooling the current of grain under atmospheric pressure, then decreasing the rate of flow to permit the grain to accumulate in a pool until the kernels swell, then placing said current under low steam pressure, suddenly releasing the pressure, then vacuum drying the kernels to remove the excess moisture and equalize the moisture content of the different kernels while also increasing the friability of the same, then cooling said grain under vacuum, and then subjecting the same to the action of damp air sufficiently to toughen the epidermis of the kernels to a suitable extent for milling.

2. A process as in claim 1, wherein water is added to the grain in proportions of about 3 to 5%, and the grain is heated for about two minutes at a temperature such as will raise the temperature of the grain to about 70° C.

3. A process as in claim 2, wherein the pool is heated to expedite the swelling.

4. A process as in claim 3, wherein the grain after being evacuated is placed under steam pressure of about one atmosphere for about two minutes.

5. A process as in claim 2, wherein the grain after being evacuated is placed under steam pressure of about one atmosphere for about two minutes.

6. A process as in claim 2, wherein the current of grain is passed through a body of water at the first step.

KARL DIENST.
WALDEMAR DIENST.

REFERENCES CITED

The following references are of record in the file of this patent:

UNITED STATES PATENTS

| Number | Name | Date |
|---|---|---|
| 1,452,871 | Dienst | Apr. 24, 1923 |
| 1,920,107 | Richardson | July 25, 1933 |
| 2,200,880 | Baer | Nov. 12, 1940 |
| 2,227,634 | Dalin | Jan. 7, 1941 |
| 2,272,663 | Graumann | Feb. 10, 1942 |
| 2,278,701 | Karr | Apr. 7, 1942 |
| 2,560,615 | Warner | July 17, 1951 |